United States Patent
Hauenstein et al.

(10) Patent No.: US 8,331,266 B2
(45) Date of Patent: Dec. 11, 2012

(54) LAN TOPOLOGY DETECTION AND ASSIGNMENT OF ADDRESSES

(75) Inventors: Markus Hauenstein, Düsseldorf (DE); Peter Niggemeier, Willich (DE)

(73) Assignee: Nokia Siemens Networks Oy, Espoo (FI)

( * ) Notice: Subject to any disclaimer, the term of this patent is extended or adjusted under 35 U.S.C. 154(b) by 1093 days.

(21) Appl. No.: 11/679,096

(22) Filed: Feb. 26, 2007

(65) Prior Publication Data
US 2007/0291665 A1    Dec. 20, 2007

(30) Foreign Application Priority Data
Jun. 14, 2006  (EP) .................................... 06115476

(51) Int. Cl.
*H04L 12/28*    (2006.01)
*H04L 12/56*    (2006.01)
*G06F 15/16*    (2006.01)

(52) U.S. Cl. .................... 370/255; 370/389; 370/395.54; 709/228

(58) Field of Classification Search .................. 370/255
See application file for complete search history.

(56) References Cited

U.S. PATENT DOCUMENTS

| | | | |
|---|---|---|---|
| 5,920,699 A * | 7/1999 | Bare ............................ | 709/225 |
| 7,113,512 B1 * | 9/2006 | Holmgren et al. ........ | 370/395.53 |
| 7,385,973 B1 * | 6/2008 | Johnson et al. ............... | 370/389 |
| 7,558,273 B1 * | 7/2009 | Grosser et al. ........... | 370/395.53 |
| 2002/0023150 A1 * | 2/2002 | Osafune et al. ............... | 709/221 |
| 2003/0037163 A1 * | 2/2003 | Kitada et al. ................... | 709/236 |
| 2003/0154306 A1 * | 8/2003 | Perry ............................ | 709/245 |
| 2003/0177220 A1 * | 9/2003 | Ohara ........................... | 709/223 |
| 2005/0180345 A1 * | 8/2005 | Meier ............................ | 370/310 |
| 2006/0013208 A1 * | 1/2006 | Rietschel et al. ............. | 370/389 |
| 2006/0062187 A1 * | 3/2006 | Rune ............................. | 370/338 |
| 2006/0126613 A1 * | 6/2006 | Zweig ............................ | 370/389 |
| 2006/0155853 A1 * | 7/2006 | Nesz et al. .................... | 709/227 |

OTHER PUBLICATIONS

Plummer, RFC 826: An Ethernet Address Resolution Protocol, Nov. 1982, Internet Engineering Task Force.*
Newton's Telecom Dictionary, 2006, CMP Books, 22nd Edition, p. 115.*

* cited by examiner

*Primary Examiner* — Andrew Chriss
(74) *Attorney, Agent, or Firm* — Squire Sanders (US) LLP

(57) ABSTRACT

A method, system, device and computer program product for automatically detecting a topology of a local area network, LAN. The LAN may be included in a telecommunication node, e.g. a base transceiver station. The LAN includes a central host and further hosts connected to the LAN. The central host sends topology descriptors to the hosts connected to the LAN, the hosts each reporting at least one of the received topology descriptors and other information to the central host. The central host can thus build up a topology data base describing the network topology. The topology descriptors are sent in broadcast frames to the hosts. A host, after having received a topology descriptor, may create one or more dedicated addresses, e.g. from the topology descriptor, and return the address(es) to the central host which may store the address(es).

37 Claims, 6 Drawing Sheets

Conventional rack-based telecommunication node

LAN-based telecommunication node

Node LAN configuration and corresponding topology descriptors

Node LAN configuration and corresponding topology descriptors

VLAN-based implementation

Switch VLAN configuration

VLAN Ethernet Format

Node LAN configuration and corresponding topology descriptors

VLAN-based implementation

Switch VLAN configuration

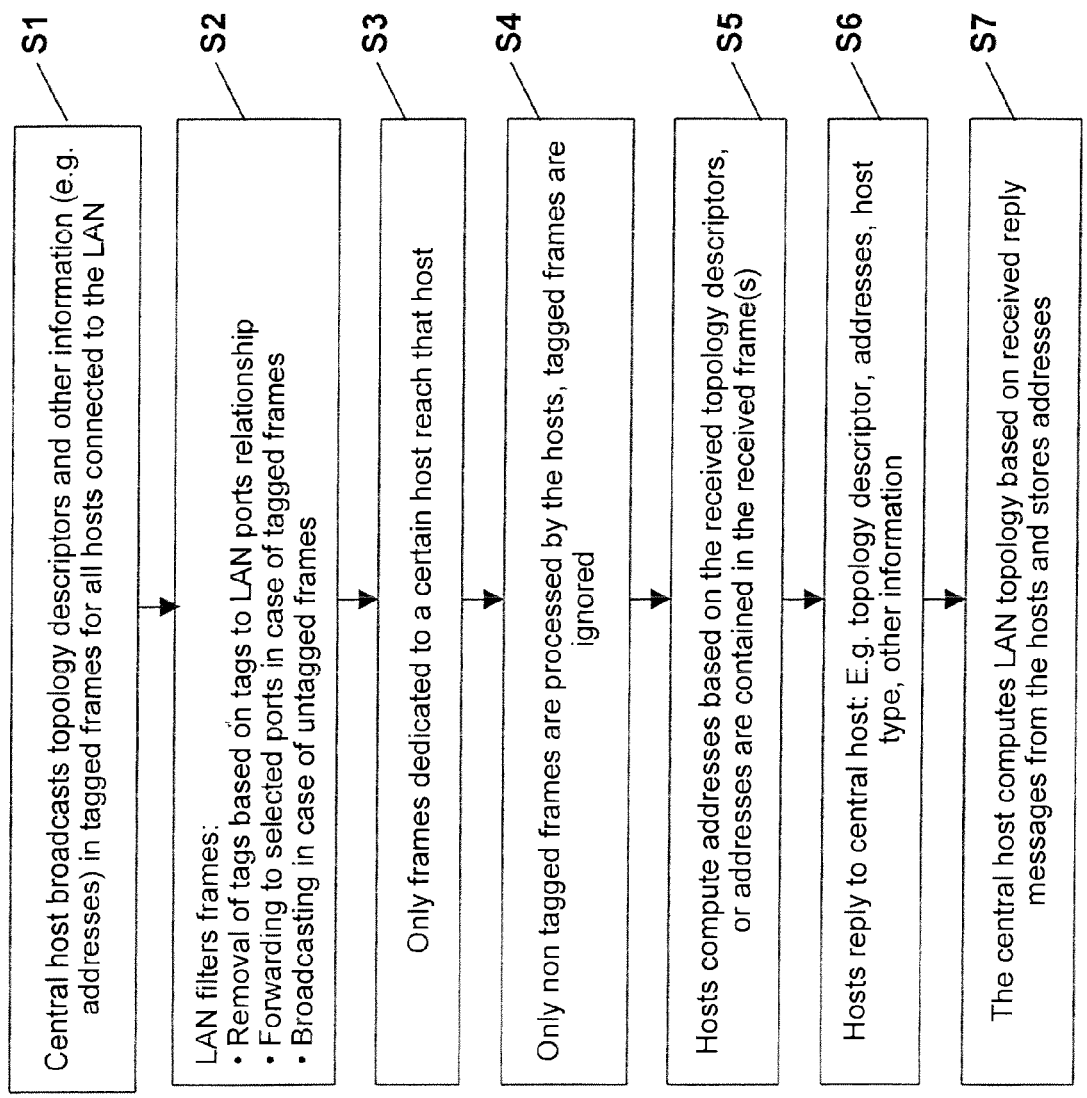

LAN TOPOLOGY DETECTION AND ASSIGNMENT OF ADDRESSES

CROSS-REFERENCE TO RELATED PATENT APPLICATIONS

The present application claims priority to European Patent Application No. 06 115 476.1, filed Jun. 14, 2006 and incorporated therein by reference in its entirety.

FIELD OF THE INVENTION

The present invention generally relates to Local Area Networks, LAN, and more specifically to the detection of a LAN topology and/or the assignment of addresses.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

From a topology point of view, a LAN consists of interconnected switches and hosts being connected to these switches.

Beside the typical application to interconnect physically separated network elements via LANs (e.g. network elements located in different offices within one building), LANs may also be used as equipment internal transmission technology to interconnect different equipment parts or modules, e.g. for telecommunication equipment such as e.g. base transceiver stations. Such telecommunications nodes then use an internal LAN for transporting control, management and user traffic.

In a conventional network element implementation, a general equipment structure of a telecommunication node may consist of a rack with slots, where the slots are interconnected via a backplane. In such a structure, control modules and interface modules may be plugged into the slots in as flexible way, and the actual number and type of plug-in modules in the rack depend on the particular application of the node. Usually there is one central module, possibly protected by a redundant central module, in charge of the housekeeping functions of the node as e.g. management interface, configuration, alarm monitoring etc. Sometimes traffic functions as e.g. switching are also located on the central module. For the proper functioning of such a node, it is essential that the central module knows the actual slot configuration, i.e. it must know which type of module is in which slot. Typically each slot has an identifier realized in hardware (e.g. coded in the backplane), which can be read by the plugged-in module, and the module can then report back its slot number and type to the central module.

Furthermore each module needs one or more unique protocol addresses for the node internal communication. The actual address type depends on the used protocol(s), e.g. Ethernet and IP are often used. Such addresses can be derived from the slot identifier (e.g. by a table look-up operation), and because the slot identifier is unique the addresses are guaranteed to be also unique within the network element.

When considering to implement communication nodes without racks and backplanes (e.g. by a modular network element design where the different modules are interconnected via cables), problems regarding identifying the topology occur, especially when modules are cascaded, so that a chain or tree of modules is connected to the central module.

Assigning unique addresses to the modules becomes another challenge, because similar modules in a chain or tree are typically programmed with the same default protocol addresses and identifiers.

Configuring those protocol addresses and identifiers manually is slow, error prone and requires a considerable effort.

Therefore it is an objective of the present invention to provide an automated, simple mechanism to solve the above outlined problems and shortcomings.

Similar type of problems can also occur when interconnecting different network elements via any LAN.

SUMMARY OF THE INVENTION

Embodiments of the invention can include a method, system, devices, network elements and computer program product such as defined in any one of the appended claims.

Embodiments of the invention can e.g. be applied to or used with communication nodes or telecommunication, telecom, nodes of a type that do not have a rack with slots. Embodiments of the invention can be used in a telecom node internal LAN interconnecting elements of this telecom node.

Embodiments of the invention can also be used for telecom nodes with rack and slots where e.g. no slot based ID mechanism is implemented or used. Thus, embodiments of the invention can also be applicable to a node with a conventional backplane, when slot identifiers coded in the backplane are not used or are not available.

Embodiments of the invention can further be used in any other type of LAN. Embodiments of the invention can e.g. be used in LANs where several network elements are interconnected via a LAN.

A central module may be realized as a closed box, incl. a central host and a switch (e.g. Ethernet), offering standard LAN, e.g. Ethernet, interfaces. This closed box is referred to herein as the central box. The other modules, such as line interface modules, radio modules, support modules of various kind etc. may also be realized as closed boxes, and may have a standard LAN, e.g. Ethernet, interface for the connection to the central host. Those modules are also referred to herein as hosts. When the number of LAN interfaces, which the central box provides, is not sufficient, intermediate (e.g. Ethernet) switches can be used. From a network point of view, such a telecommunication node is a LAN, e.g. an Ethernet LAN. But also here the central host still needs to know the equipment structure, in other words the topology of this node-internal LAN, the type of the hosts and the ID and protocol addresses of the different hosts.

Embodiment of the invention provide a solution for this task. Even when the equipment structure uses standard interfaces such as Ethernet interfaces, and identical hosts with similar default identifiers and protocol addresses, it is possible to ensure their uniqueness in case of several identical intermediate LAN elements (e.g. switches or bridges).

Although there is no slot identifier with such LAN nodes such as the Ethernet LAN-based nodes, a mechanism is provided for deriving preferably unique addresses, protocol addresses, which are used for the node-internal communication.

According to certain embodiments of the invention, a VLAN-based software solution is provided for sending topology descriptors from the central host to all other LAN hosts such as Ethernet hosts (e.g. implementing transmission or radio functionality) in the node LAN. A LAN host such as an Ethernet host can then report back the received topology descriptor and its host type, and the central host can build up an equipment view or topology data base based on the returned information of all hosts. When intermediate switches are deployed, the central host can also deduce this fact from the returned descriptors.

In the end, the central host has complete knowledge about the topology of the node LAN. With the received unique topology descriptors, the connected hosts can optionally also create protocol addresses (e.g. Ethernet MAC addresses and IP addresses), which are preferably unique inside the node.

Embodiments of the invention may be implemented using network communication technology such as Ethernet and/or VLAN technology. The usage of Ethernet may be preferred depending on the implementation but is not mandatory.

In one embodiment of the invention, a VLAN-based software solution is used for sending topology descriptors from a central host to all other Ethernet hosts in a LAN which preferably is a LAN internal of a network element (e.g. a telecommunication node). Based on the returned information from the hosts the central host can build up an equipment view or topology data base of the network element.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the enclosed drawings, in which:

FIG. 11 is a flow diagram illustrating an embodiment of a method in accordance with the present invention.

DETAILED DESCRIPTION OF VARIOUS EMBODIMENTS OF THE INVENTION

In the following, various embodiments of the invention will be described with reference to the drawings.

Figure 1:
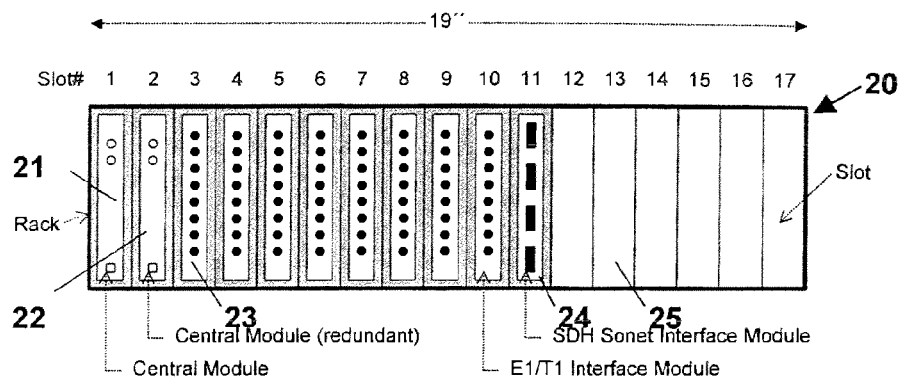
FIG. 1 is an example of a conventional rack-based telecommunication node in the form of a modular SDH/SONET Add/Drop-Multiplexer.

FIG. 1 shows an example of a conventional rack-based telecommunication node 20 in the form of a modular SDH/SONET Add/Drop-Multiplexer which includes a plurality of slots 1 to 17 with a central module 21 in slot 1, a redundant central module 22, if provided, in slot 2, interface modules 23 such as E1/T1 interface modules in slots 3 to 10, an SDH Sonet interface module in slot 11, and empty slots 12 to 17.

In one embodiment of the invention, preferably at least one of the features: LAN topology detection, e.g. of an Ethernet LAN, and assignment of unique addresses with a LAN such as a VLAN, Virtual LAN, may be provided.

In general, addresses must not be unique and could be for example any type of MAC or IP addresses (e.g. unicast, multicast, broadcast types), UDP or TCP port numbers or any other type of protocol addresses.

In some of the preferred embodiments, a node internal LAN is used to interconnect elements of the node (hosts) forming the node functionality.

Abbreviations used in the text have the following meaning. ADM, Add/Drop-Multiplexer; BTS, Base Transceiver Station; IP, Internet Protocol; LAN, Local Area Network; MAC, Media Access Control; SDH, Synchronous Digital Hierarchy; TRX, Transceiver; VLAN, Virtual LAN.

Figure 2:
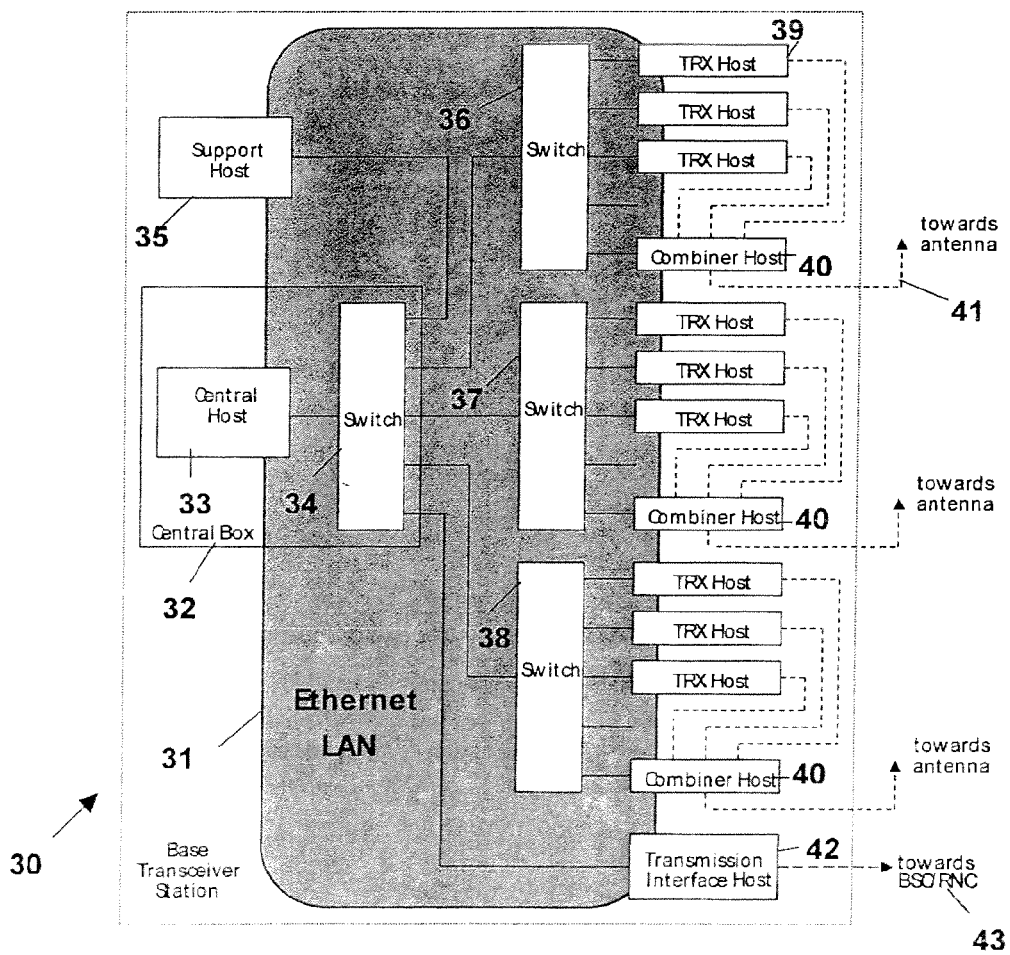
FIG. 2 is an example of a type of Ethernet-based telecommunication node forming a mobile-network Base Transceiver Station, BTS, which may be configured in accordance with embodiments of the invention.

FIG. 2 shows a node 30 in accordance with one embodiment of the invention where node 30 may be e.g. a telecommunication node such as a Base Transceiver Station, BTS, of a mobile network. The node 30 may for example be an Ethernet-based telecommunication node. The node 30 includes a LAN 31, preferably an Ethernet-based LAN, and several hosts which preferably comprises a central host 33 and other hosts. The central host 33 serves for controlling the node 30 and may be included in a central box 32. The central box 32 may include the central host 33 and a switch 34.

The node 30 may include a support host 35 providing some node support functions like e.g. external alarm input/outputs.

The LAN 31 comprises intermediate switches 36, 37, 38 which are connected with the switch 34 of the central box 32. The number of intermediate switches depends on the required or planned capacity of the node or other parameters and may vary from zero to any arbitrary number, in the present embodiment three. The switch 34 is furthermore directly connected to the support host 35 and to a transmission interface host 42, which provides an interface to a Base Station Controller, BSC, and/or Radio Network Controller, RNC, 43.

The intermediate switches 36 to 38 are connected to base station elements (transceiver element 39, TRX hosts and combiner element 40, combiner hosts).

The support element 35, TRX elements 39 and combiner elements 40 in FIG. 2 are all hosts, e.g. Ethernet hosts, of the LAN 31.

In the example shown in the drawings, embodiments of the invention are used internally within the node 30. Preferably, in such a structure, the LAN connections such as the LAN connections between the hosts, intermediate switches 36 to 38, switch 34, and the central host 33 are of point-to-point type.

The following architecture restrictions, provisions or requirements may, but need not necessarily apply and can be taken into account with regard to the solutions provided by embodiments of the invention.

The central box 32 of the node 30 such as a communication node preferably includes the switch 34 as a first or central switch which may be an Ethernet switch. Additional intermediate switches 36 to 38 usually need to be connected to the central host anyway, so at least one switch, e.g. Ethernet switch 34, is needed. Therefore, it is of advantage, but not indispensable, to integrate one switch 34 into the central box 32 together with the central host 33.

The host 33 can then be viewed as a central host, e.g. an Ethernet host, which is connected to the central switch 34. In the following the central host 33 and the switch 34 are named central box 32. The corresponding switch port of the switch 34, to which the central host 33 is connected, can be fixed and need not be changed.

The switches 34 and 36 to 38 preferably are unmanaged because the housekeeping functions of the node 30 shall be kept as simple as possible. So complicated schemes including the (e.g. SNMP-based) management interfaces of the Ethernet switches are not needed.

Also, to provide a simple structure or control, preferably there is no need to reconfigure the switches 34, 36, 37, 38 during runtime. There is no need to access the management interface of the switches during runtime. The switches shall boot with a fixed configuration, which does not need to be changed.

All intermediate switches 36 to 38 preferably have the same configuration. The hosts (e.g. support host 35, TRX hosts 39, transmission interface host 42, combiner hosts 40 in FIG. 2) can e.g. be very simple Ethernet hosts, in particular they are preferably not required to process (e.g. Ethernet) VLAN headers. This simplifies the host implementation significantly.

The central host 33 of the central box 32 sends out topology descriptors. The topology descriptors are preferably contained in broadcast frames, e.g. Ethernet broadcast frames (i.e. destination MAC address is hex FF:FF:FF:FF:FF:FF). Broadcast frames are preferred because a host, e.g. an Ethernet host, (e.g. support box 35, TRX boxes 39, combiner boxes 40 in FIG. 2) shall get a specific topology descriptor because it is connected to a specific switch port, not because it has a certain MAC address. The implementation can, in some embodiments, use the same set of locally administered MAC addresses in each node 30 such as a BTS, because this can simplify the implementation. The point of attachment to the LAN, e.g. BTS LAN 31 is then the differentiating factor to ensure network-internal unique MAC addresses. So it is the received topology information, which the hosts must then use to derive a network-internally unique MAC address. This also means that at that the point in time when the hosts receive their topology descriptor, they do not yet have a proper MAC address, and the hosts can anyway only receive broadcast frames (depending on the implementation, the network, e.g. Ethernet, interface may however be configured with some intermediate dummy address).

In the following, a general process will be described.

The central host 33 sends out or broadcasts frames within the LAN, preferably VLAN, e.g. Ethernet broadcast frames, containing topology descriptors in the payload. All other hosts in the node LAN receive their corresponding topology descriptors as simple non-VLAN broadcast frames (the switches may strip the VLAN headers, depending on the topology IDs and the destination switch ports before forwarding the frames to the destination switch ports). Depending on its connection to the LAN, a host shall receive one or more topology descriptors in untagged frames:

If the host is directly connected to the central box 34, such as transmission interface host 42, it will receive only one topology descriptor in an untagged frame directly describing the port number of the switch 34 to which the host, here 42, is connected.

If there is an intermediate switch, such as 36, 37, 38, in-between, the host, e.g. 39 or 40, will receive two topology descriptors in untagged frames:

The first topology descriptor will describe the port number of the switch 34 to which the intermediate switch 36, 37 or 38 is connected. The second topology descriptor will describe the port number of the intermediate switch 36, 37, 38, which is connected to the central box 32, plus the port of the intermediate switch 36, 37, 38 to which the receiving host is connected.

Figure 3:
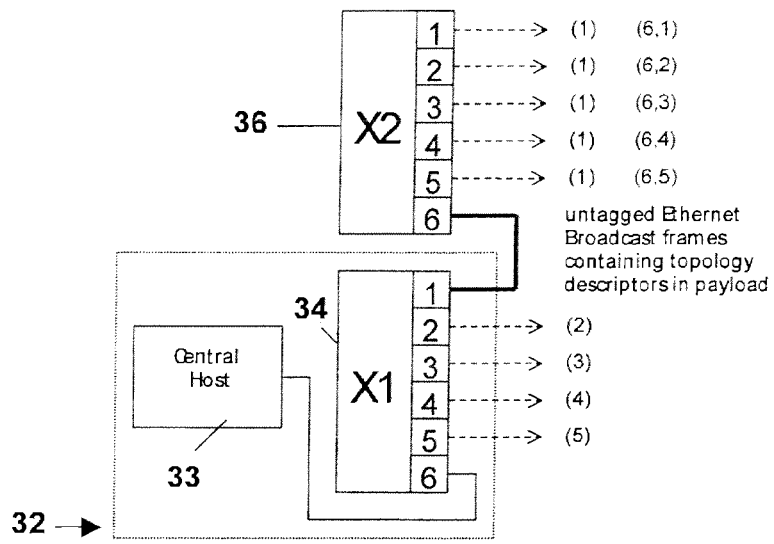
FIG. 3 is a LAN configuration of a node and corresponding topology descriptors in accordance with one embodiment of the invention.
Figure 4:
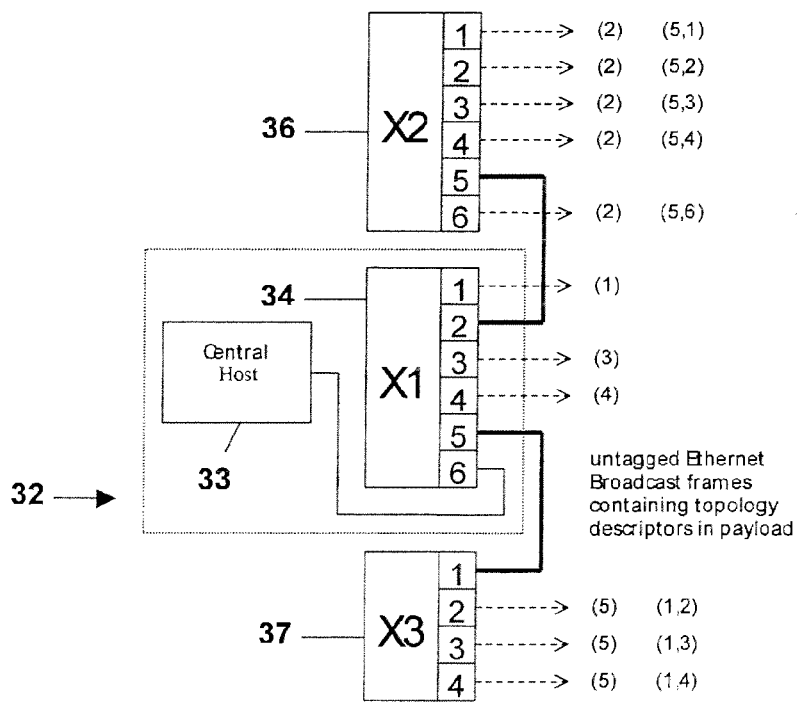
FIG. 4 is a LAN configuration of a node and corresponding topology descriptors in accordance with another embodiment of the invention.

FIGS. 3 and 4 show such structures. FIG. 3 illustrates an example (example 1) of a LAN configuration of the node 30 and corresponding topology descriptors. FIG. 4 shows another example (example 2) of a LAN configuration of the node 30 and corresponding topology descriptors.

The node configurations of FIGS. 3 and 4 are examples of a variety of different embodiments. The structure and other parts shown in FIG. 2 are also applicable to the embodiments of FIGS. 3 and 4.

In FIGS. 3 and 4, the switch 34 (X1) of the central box 32, and the switch 36 (X2) are switches having six ports "1" to "6" each. Port 6 of switch 34 (X1) is connected to the central host 33 for communication therewith. In FIG. 3, port 6 of switch 36 (X2) is connected to port 1 of switch 34 (X1), wherein Ethernet Broadcast frames containing topology descriptors in the payload area are sent from switch 34 (X1) to switch 36 (X2).

In FIG. 4, port 5 of switch 36 (X2) is connected to port 2 of switch 34 (X1). Ethernet Broadcast frames containing topology descriptors in the payload area are sent from switch 34 (X1) to switch 36 (X2) via this connection. Further, in FIG. 4, port 5 of switch 34 (X1) is connected to port 1 of switch 37 (X3). Ethernet Broadcast frames containing topology descriptors in the payload area are sent from switch 34 (X1) to switch 37 (X3) via this connection.

Having received their corresponding topology descriptors in untagged frames, the Ethernet hosts, e.g. 35, 39, 40, 42, can optionally create network addresses, preferably unicast network addresses, such as LAN addresses, Ethernet-IDs, or Ethernet Media Access Control, MAC, addresses from this information, e.g. by a look-up operation in a pre-defined table mapping topology descriptors to addresses, which are guaranteed to be unique in the node. The Ethernet hosts, e.g. 35, 39, 40, 42, can also optionally create IP addresses from this information if IP is used node-internally. Using its just created or an already available hard-coded MAC address which may have been set in production, the Ethernet host can return the received topology descriptor and module type information (possibly in processed form as some protocol message) back to the central host 33. The central host 33 receives then address, topology and module type information from all connected hosts and can build up a complete equipment view including the switches. The central host 33 finally knows exactly what switches and hosts are present in the node LAN, and what MAC (and possibly IP) addresses the hosts have.

In order to detect changes in the node configuration (e.g. addition and removal of hosts, or host failures), the process can run through periodically, e.g. every few seconds.

Figure 5:
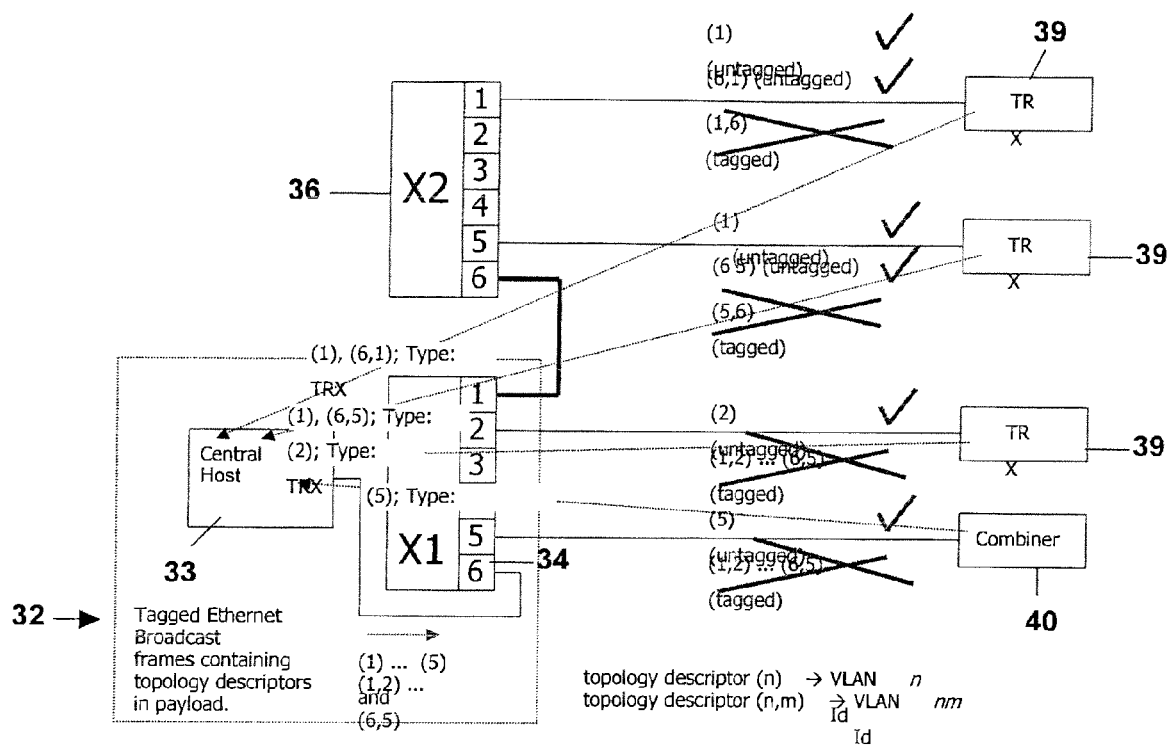
FIG. 5 is a VLAN-based implementation of one embodiment in accordance with the invention.

Implementation details of one embodiment of the invention are explained in FIG. 5, based on an example with a simple node configuration with two 6-port switches 34 (X1), 36 (X2) and four external hosts, e.g. Ethernet hosts such as transceivers 39 and combiners 40.

The central host 33 sends out VLAN-tagged Ethernet broadcast frames with ("first level") VLAN Identifiers 1, 2, 3, 4, 5 and also with ("second level") VLAN Identifiers 12, 13, 14, 15, 16, 21, 23, 24, 25, 26, . . . , 51, 52, 53, 54, 55, 56. The VLAN identifiers correspond to the topology descriptors, i.e.

in the payload of such a frame there is basically provided a copy of the VLAN identifier (perhaps in a different binary coding).

The switch 34 (X1) and the switch 36 (X2) (there is only one intermediate switch in this example, but generally there can be more than one) have a different VLAN configuration. The switch 34 (X1) has the ("first order") VLANs 1 . . . 5 configured, and to each VLAN n belong the two ports n and 6. Port 6 (the port with the highest port number) is the port to which the central host 33 is connected. These VLANs are configured such that the frames leave the switch untagged. So each host directly connected to the switch 34 (X1) sees a single ordinary untagged broadcast frame containing the proper topology descriptor (n) describing the switch-port n of switch 34 (X1).

Furthermore, all ports of the switch 34 (X1) belong also to the ("second order") VLANs 12 up to 56. These are configured such that the frames keep their VLAN header and leave the switch 34 (X1) still tagged (this allows them to be individually processed by the intermediate switches).

The switch 36 (X2) knows only the second order VLANs 12 up to 56. To each VLAN nm (n denotes the first digit and m the second) only belong the two ports n and m of 36 (X2). The VLAN egress configuration is asymmetrical so that a frame from VLAN nm will leave port m untagged and port n tagged.

Figure 6:
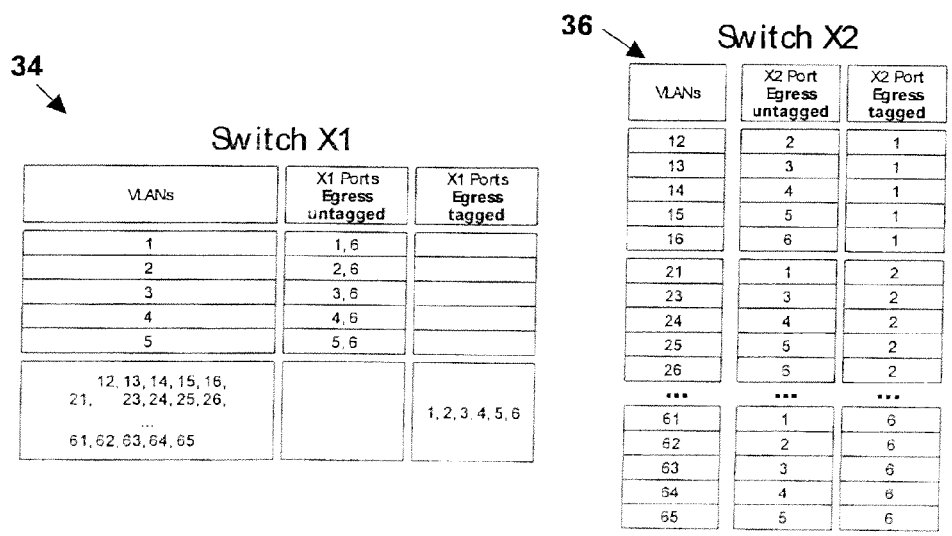
FIG. 6 is a switch VLAN configuration in accordance with one embodiment of the invention.

This VLAN configuration is visualized in FIG. 6. The columns VLANs, Ports Egress untagged, Egress tagged, of the tables shown in FIG. 6 lists the VLANs and the associated ports in the switches 34 (X1), 36 (X2).

Figure 7:
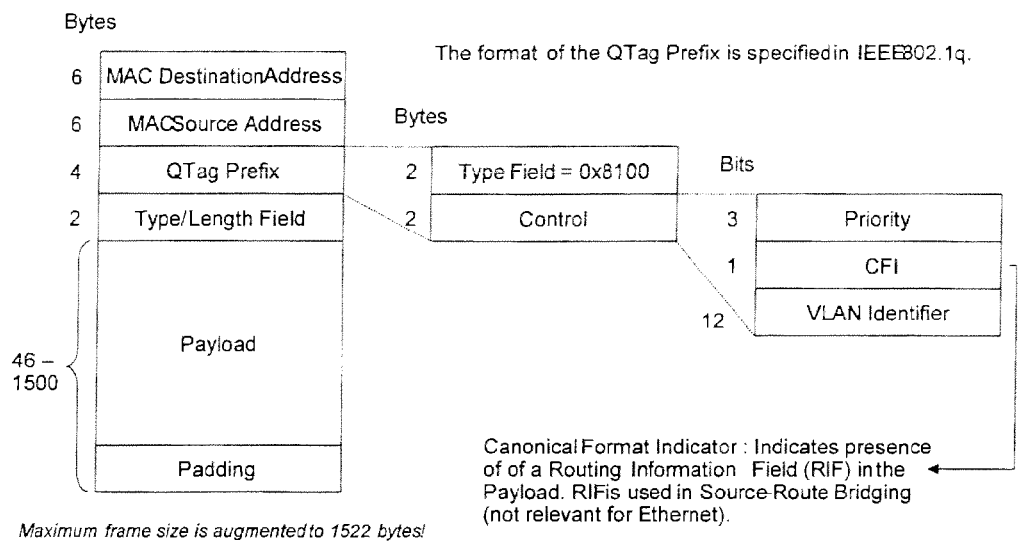
FIG. 7 is a VLAN Ethernet Format according to IEEE 802.1q.

The Ethernet hosts in the node LAN 31, as shown in FIG. 2, will discard received tagged frames and will only process untagged frames: Tagged Ethernet frames are identified by an EtherType value of 0x8100. This is depicted in FIG. 7 which shows a VLAN Ethernet Format according to IEEE 802.1q. The frame includes the fields MAC Destination Address, MAC Source Address, QTag Prefix, Type/Length Field, Payload, and Padding, having byte numbers as indicated. The maximum frame size is augmented to 1522 bytes.

The format of the QTag Prefix of the frame is specified in IEEE802.1q. The Canonical Format Indicator CFI in the control field of the QTAG prefix indicates presence of a Routing Information Field RIF in the payload. RIF is used in Source-Route Bridging which is not relevant for Ethernet.

As mentioned above, tagged Ethernet frames are identified by an EtherType value of 0x8100. Simple Ethernet hosts (as the hosts in the node LAN 31 in FIG. 2) will treat this as an unknown EtherType and will therefore discard the frame since they have no upper layer application to which they could deliver the frame. Untagged frames will however have a known EtherType, which is possibly a proprietary EtherType especially used for this topology detection application, or just the well-known EtherType for IP when the topology detection application runs on top of IP. The hosts will therefore only forward the received untagged frames to the topology detection software component.

Since Ethernet broadcast frames are used, the hosts can receive them at an early stage in their start-up phase when they do not yet have a configured unicast Ethernet MAC address (unicast MAC addresses must be unique in the node). The hosts can then even create a node-internally unique Ethernet MAC address based on the received topology descriptor, since the descriptor is also unique. Also node-internally unique IP addresses can be created.

One example of how the unique address generation in the hosts, based on the received topology descriptors by the hosts, can be done is illustrated in the following paragraph and table.

An example of an Address Lookup Table, which maps to FIG. 5 (one first level switch+one second level switch connected to Port 1 of the Switch (X1)) is as follows:

| Topology ID | MAC Address | IP Address |
| --- | --- | --- |
| (1) | 00:11:22:33:44:01 | 192.168.255.1 |
| (2) | 00:11:22:33:44:02 | 192.168.255.2 |
| (3) | 00:11:22:33:44:03 | 192.168.255.3 |
| (4) | 00:11:22:33:44:04 | 192.168.255.4 |
| (5) | 00:11:22:33:44:05 | 192.168.255.5 |
| (1), (x, 1) | 00:11:22:33:44:11 | 192.168.255.11 |
| (1), (x, 2) | 00:11:22:33:44:12 | 192.168.255.12 |
| (1), (x, 3) | 00:11:22:33:44:13 | 192.168.255.13 |
| (1), (x, 4) | 00:11:22:33:44:14 | 192.168.255.14 |
| (1), (x, 5) | 00:11:22:33:44:15 | 192.168.255.15 |
| (1), (x, 6) | 00:11:22:33:44:16 | 192.168.255.16 |
| . . . | . . . | |
| (5), (x, 5) | 00:11:22:33:44:55 | 192.168.255.55 |
| (5), (x, 6) | 00:11:22:33:44:56 | 192.168.255.56 |

This table is pre-programmed in all hosts.

As an example, transceiver host (39) connected to Port-1 of X2(36) receives topology descriptor ID's (1) and (6,1), where
 (1) means that it is connected to Port 1 of Switch X1
 (6,1) means that it is connected to Port-1 of a second-level switch (X2) and Port 6 is the uplink port of X2(36) to X1(34).

All topology information (i.e. (1), (6,1)) is relevant for the Central Host 33 to calculate the topology (i.e. the central host needs to know how X2 is connected with X1 etc).

For Address Calculation the uplink port from X2 to X1 is not relevant and is replaced by "x" in the table above. Only the port of X1 where X2 is connected to and the port of X2 where the transceiver host (39) is connected to, i.e. (1), (x,1) is relevant. This results in the following addresses for transceiver host (39):
 MAC Address=00:11:22:33:44:11
 IP Address=192.168.255.11

The combiner (40) is directly connected to port 5 of X1(34), and thus only receives the topology information (5). This results in the following addresses:
 MAC-address=00:11:22:33:44:05
 IP-Address=192.168.255.5

When the switch X1 forwards a first order VLAN frame to an intermediate switch, e.g. X2, this broadcast frame egresses the switch X1 untagged. Therefore the broadcast is forwarded to all ports of the intermediate switch X2 in the conventional manner and reaches all hosts connected to the intermediate switch X2.

The switch 34 forwards all second order broadcast frames to each of its ports, and they remain tagged when leaving the switch. When they then ingress at a port k of an intermediate switch X2, only the VLANs nm with k=n or k=m are further processed, and the intermediate switch discards all other frames (because of the chosen VLAN configuration the ingress port belongs only to these VLANs, and the switch immediately discards all frames from VLANs, to which the ingress port does not belong). The remaining frames are forwarded to their respective egress ports: If the ingress port (i.e. the port connected to the central box) is n and the egress port (i.e. the port to which the Ethernet host, e.g. a transceiver host is connected) is m, an untagged Ethernet broadcast frame with topology descriptor (n,m) in the payload will leave the switch (the intermediate switch X2 strips the VLAN header from the incoming frame with VLAN Id nm prior to sending out the frame), plus a tagged frame with VLAN Id mn and topology descriptor (m,n) in the payload. The receiving Ethernet host will however discard the tagged frame because of the unknown EtherType, and only the topology descriptor (n,m) is forwarded to the topology detection software component.

With this asymmetric VLAN configuration in the intermediate switch X2, it is possible to detect whether e.g. the intermediate switch uplink port (i.e. the port connected to the central box) is port number 6, and the Ethernet host is connected to port number 1, or whether it is the other way around.

A host, e.g. an Ethernet host may thus receive one or two topology descriptors (in untagged frames, and only these are relevant and not discarded). When a first level topology descriptor is received, the host must be prepared to receive or not receive a second level topology descriptor.

The required VLAN configurations are supported by state-of-the-art Ethernet switch chips.

The hosts report all received topology ID's within one message back to the central host 33. In the example of FIG. 5, the following reports are received, generated and/or sent.

Transceiver host(39) connected to port-1 of X2(36) receives (1), (6,1), and it reports back "(1),(6,1)". Therefore, the central host knows that
there is a switch X2, and the host is connected to port-1 of X2 (x,1)
Port-6 of X2 is connected to Port-1 of X1 (6,x).

The combiner host (40) connected to port-5 of X1 (34) receives topology ID (5) only; it reports back "(5)". So the central host knows that the combiner host is directly connected to port-5 of X1.

In the above described example embodiments, 6-port switches are used. The topology detection algorithm is of course not restricted to such switches, and the algorithm can be used for switches with more or less ports. If the switches have more than 10 ports, it might be easier and clearer to use a different number system in the concept, e.g. the hexadecimal system in case of 16-port switches, to name the ports. It is also not required that all switches have the same number of ports.

In the following, a simplified scheme with dedicated uplink port in an intermediate switch, e.g. 36, is described.

Figure 9:
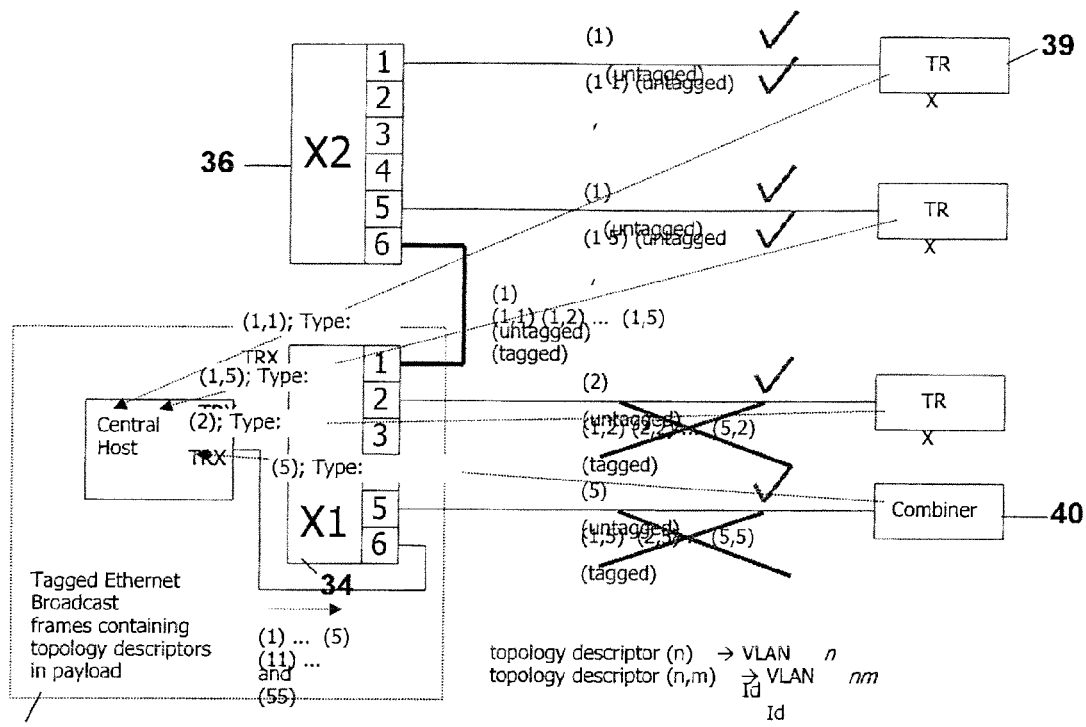
FIG. 9 is a VLAN-based implementation in accordance with one embodiment of the invention.
Figure 10:
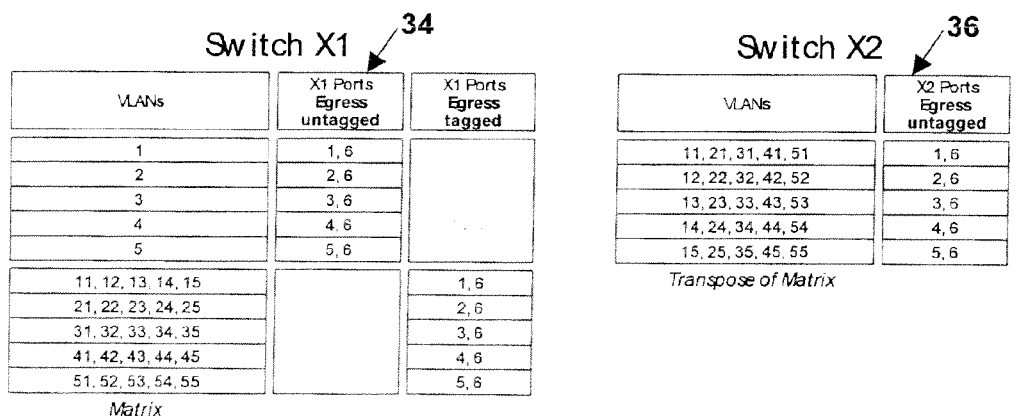
FIG. 10 is a switch VLAN configuration in accordance with one embodiment of the invention.

In some applications it might be acceptable to have a fixed uplink port in the intermediate switch 36 (X2). Then the topology detection algorithm does not need to detect the uplink port, and a slightly less complicated algorithm can be applied. The algorithm is visualized in FIGS. 8, 9, and the corresponding VLAN configuration of the switches is shown in FIG. 10.

Asymmetric VLANs are not needed here. For the second level VLANs, in this embodiment of the invention, the idea is to organize the VLANs in a matrix like manner. A matrix is used in the switch X1 and its transpose matrix in the switch X2.

In this case the first level topology descriptor received by a host connected to an external switch box is redundant and also included in the second level topology descriptor, i.e. such a host will receive the descriptors (n) and (n,m). In this case it is sufficient when the host only returns the second level topology descriptor to the central module.

Figure 8:
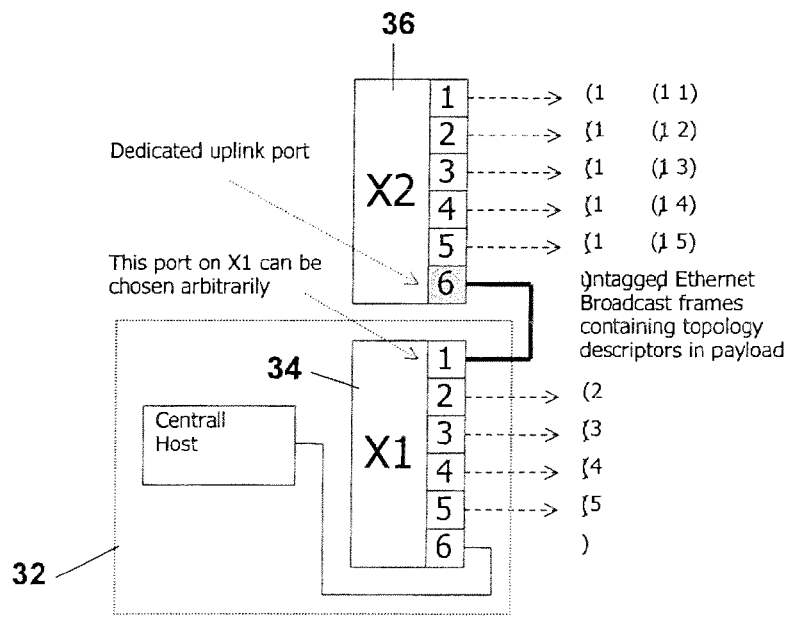
FIG. 8 is a node LAN configuration and corresponding topology descriptors in accordance with one embodiment of the invention.

FIG. 8 shows the node LAN configuration and corresponding topology descriptors for this simplified case. FIG. 9 illustrates the VLAN-based implementation, and FIG. 10 the switch VLAN configuration for this simplified case. In FIGS. 8, 9, and 10, port 6 of switch 36 (X2) is a dedicate uplink port. Port 1 of switch 34 (X1) can be arbitrarily chosen.

As shown in FIG. 9, for simplicity reasons the topology descriptor (n) corresponds to the VLAN Id n, and the topology descriptor (n,m) to the VLAN Id nm.

Based on the responses of the hosts, which consists of the received topology descriptors and the host type, the central host 33 learns and memorizes that the hosts replying with (1,1), (1,5), and (2) are transceivers, and the host replying with (5) is a combiner.

FIG. 10 shows, in the columns "VLANs", the VLAN matrix of switch 34 (X1) and the transpose of this VLAN matrix in the switch 36 (X2).

FIG. 11 shows a flow diagram illustrating an embodiment of a method in accordance with the present invention. In step S1, the central host broadcasts topology descriptors and other information (e.g. addresses) in tagged frames for all hosts connected to the LAN.

In step S2, the LAN filters frames, preferably using one or more, or all, of the following functions:
Removal of tags based on tags to LAN ports relationship,
Forwarding to selected ports in case of tagged frames,
Broadcasting in case of untagged frames.

According to step S3, only frames dedicated to a certain host reach that host.

As shown in step S4, only non tagged frames are processed by the hosts, tagged frames are ignored.

In step S5, hosts compute addresses based on the received topology descriptors, or addresses are contained in the received frame(s).

Hosts reply, in step S6, to the central host: E.g. topology descriptor, addresses, host type, other information.

In step S7, the central host computes LAN topology based on the received reply messages from the hosts and stores addresses.

The proposed method according to this embodiment of the invention may be implemented purely based on software, so that no extra hardware is needed. Embodiments of the invention can be used with or in Ethernet or other type of LAN-based telecommunication nodes.

As already mentioned above, the proposed method and devices are also suitable for creating node-internal unique protocol addresses, e.g. Ethernet MAC addresses and IP addresses.

Although the method has been described with reference to Ethernet as a preferred embodiment, embodiments of the invention can also use other protocols or LAN types such as layer-2 protocols supporting VLAN according to IEEE 802.1q.

Embodiments of the invention enable determining network topology and characteristics of network elements having an internal LAN based on e.g. an Ethernet architecture, for use in internal network-element control, network management etc. purposes. The "central box" may include a switch such as an Ethernet switch, and is the network element that has a central position in network topology and has been configured to find out the topology structure. The central box includes the central host, which broadcasts specific "topology descriptors" (TD) to other hosts that are connected either directly, or via an intermediate switch, e.g. Ethernet switch, to the central box. Based on its received specific TD, such a host can create addresses (e.g. IP and/or Ethernet MAC), which are unique in the network element. The host shall then send back their received TD to the central host, together with all relevant host type information. After having received all TD and host type information, the central host can analyze the internal Ethernet topology of the network element. Embodiments of the invention thus also provide a "topology detection application".

Embodiments of the invention can include the feature of giving addresses such as MAC/IP addresses for the elements on the topology basis, and/or returning element type identification. According to various embodiments, a topology descriptor is used. The topology descriptor and the feature of giving address numbers to elements by using topology descriptors, are preferably provided when implementing embodiments of the invention.

Embodiments of the invention preferably comprise at least one or more of the following steps, devices or functions in any arbitrary combination.

1.) Broadcasting step or function: The central host broadcasts topology descriptors for all hosts connected to the LAN;

2.) Filtering step(s) or functions: The LAN filters the frames containing the topology descriptors such that only frames dedicated to a certain host reach that host (depending on the position of the host in the topology).

In the implementation, the filtering is preferably done in the switch(es). At least some of the following sub-steps for the filtering process can be provided.

2a) The filtering is based on the tags in the tagged frames received from the central host;

2b) Tags are removed from the filtered frames that are dedicated to a potential host connected to a certain switch port;

2c) Received non-tagged frames are broadcasted to all ports;

2d) Optional: There can be several filtering hierarchies (switch hierarchies) to enlarge the LAN and to increase the number of hosts that can be connected;

2d.1) Tagged frames targeted to hosts on a lower hierarchy level (i.e. further away from the central host) are forwarded to the switch ports without removing the tag;

2d.2) Lower level switches receive tagged frames then and filter based on the tags;

2d.3) Lower level switches remove tags from filtered frames that are dedicated to a potential host connected directly to one of their switch ports.

2e) Optional: A fixed uplink port of a switch is used to simplify the implementation.

3.) Hosts receiving dedicated frame(s)—Only non tagged frames are processed by the hosts, tagged frames are ignored.

4.) Optional: Hosts compute addresses (preferably unique addresses) based on the received topology descriptor(s)=>the received topology descriptors are unique for each host in this LAN. Note, depending on how the unique address(es) shall be generated, some pre-programmed look-up tables in the hosts might be required. As alternative, the addresses can be also generated by appending the received topology descriptors to a prefix. As a further alternative, addresses might also be contained in the frames.

5.) Hosts reply to central host.

The reply message contains all topology descriptors received by the host (for the simplified mechanism with fixed uplink port at the switches, not all information coded in the received topology descriptors need to be included in the reply message.

But it is also possible to report all received topology descriptors back to the central host in the simplified implementation).

Optionally the following information can be returned by the hosts, too, the a) host type, and/or the b) computed address (es).

6.) The central host computes LAN topology based on received reply messages from the hosts.

In one of the embodiments of the invention, VLAN can be used for tagging. The tagging can also be implemented without use of VLAN selecting other tagging techniques. Selecting VLAN as the technology for the tagging provides the advantage that available commercial standard components can be used in the implementation.

VLAN is not involved in the address generation process performed by the hosts. VLAN tagged frames are ignored by the hosts, therefore the hosts need not use VLAN for the address generation.

The node internal implementation can also be used for embodiments of the invention.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    sending, in broadcast frames, at least one topology descriptor from a central host to at least one further host;
    filtering, by at least one switch, the broadcast frames containing the sent at least one topology descriptor in such a way that only frames dedicated to a certain host reach, or are processed by, that host, wherein a frame dedicated to a certain host is a frame containing at least one topology descriptor describing the port number of the switch to which that host is directly connected;
    receiving, at the at least one further host, the at least one topology descriptor sent in frames dedicated to the at least one further host;
    reporting, from each of the at least one further host, the received at least one topology descriptor to the central host;
    building up, at the central host, a topology data base describing the network topology based on the reported received at least one topology descriptor.

2. The method of claim 1, wherein the sending of the at least one topology descriptor is sent in payloads of broadcast frames or untagged broadcast frames.

3. The method of claim 1, wherein the at least one further host and the central host are network elements which are interconnected via a local area network.

4. The method of claim 1, wherein the at least one further host and the central host are internal elements of a local area network based network element.

5. The method of claim 4, wherein connections between the internal elements are of point-to-point type connections.

6. The method of claim 1, wherein the filtering is based on tags in the frames received from the central host.

7. The method of claim 6, wherein the tags are removed from filtered frames that are dedicated to a potential host connected to a certain port.

8. The method of claim 6, further comprising:
broadcasting received non-tagged frames to all ports of the at least one switch;
using a switch hierarchy to enlarge a local area network and to increase the number of hosts that can be connected;
forwarding tagged frames targeted to a host on a lower hierarchy level to ports of the switch without removing the tag;
receiving, at a switch on a lower level, tagged frames and filtering the tagged frames based on the tags; and
removing, by the switch on the lower level, a tag from filtered frames that are dedicated to a potential host connected to a certain port of the switch on the lower level.

9. A method according to claim 1, further comprising: determining, by a host receiving dedicated frames, whether a received frame is tagged and processing non tagged frames while ignoring tagged frames.

10. A method according to claim 9, wherein the dedicated frames comprises at least one address from which at least one host selects its host address.

11. A method according to claim 1, further comprising: computing, by at least one host, at least one unique address based on the received topology descriptor.

12. A method according to claim 1, further comprising: performing, by the at least one further host comprising a pre-programmed look-up table, at least one of computing one or more addresses and generating the one or more addresses by appending the received topology descriptor to a prefix.

13. A method according to claim 1, wherein a reporting message of the at least one further host to the central host comprises information comprising at least one of:
all topology descriptors received by the at least one further host,
the host type, and
at least one computed address of the at least one further host.

14. A method according to claim 1, wherein a local area network comprises at least one intermediate switch provided between the central host and the at least one further host, and further comprising: detecting, by the central host, the existence of the at least one intermediate switch from the reported descriptor.

15. A method according to claim 1, wherein a local area network comprises at least one intermediate switch provided between the central host and the at least one further host, the at least one intermediate switch comprising a fixed uplink port for communication with the central host.

16. A method according to claim 1, further comprising: generating, by port numbers of ports to which the at least one further host is connected, identifiers to identify the at least one further host in a local area network.

17. A method according to claim 1, further comprising: assigning, by the central host, addresses to the at least one further host based on at least one of the topology and the topology descriptor.

18. A method according to claim 1, wherein an intermediate switch is provided in a virtual local area network connected to the at least one further host and the central host, the central host communicating with a switch, wherein a central box comprises the switch and the central host, wherein the switch comprises at least one matrix, and wherein the intermediate switch comprises at least one transpose matrix of one of the at least one matrix.

19. A method according to claim 1, wherein a local area network comprises at least one of an Ethernet local area network, a virtual local area network, and wherein the at least one further host is an Ethernet host.

20. A system, comprising:
a local area network having at least one switch;
a central host; and
at least one further host directly connected to one of said at least one switch, wherein:
the central host of the local area network is configured to send, in broadcast frames, at least one topology descriptor to the at least one further host,
the at least one switch is configured to filter the broadcast frames containing the sent at least one topology descriptor in such a way that only frames dedicated to a certain host reach, or are processed by, that host, wherein a frame dedicated to a certain host is a frame containing at least one topology descriptor describing the port number of the switch to which that host is directly connected;
the at least one further host is configured to receive the at least one topology descriptor sent in frames dedicated to the at least one further host;
the at least one further host is configured to report the received at least one topology descriptor to the central host; and
the central host is configured to build up a topology data base describing the network topology based on the reported received at least one topology descriptor.

21. The system according to claim 20, wherein the at least one further host is configured to send a reporting message to the central host, the reporting message comprising at least one of:
all topology descriptors received by the host,
the host type, and
at least one address belonging to the at least one further host.

22. A system according to claim 20, wherein the local area network includes at least one intermediate switch provided between the central host and the at least one further host, the at least one intermediate switch comprising a fixed uplink port for communication with the central host.

23. A system according to claim 20, wherein the system is configured to assign at least one address to the at least one further host, wherein the at least one further host, after having received a topology descriptor, is configured to create the at least one address, and return the at least one created address to the central host, and wherein the central host stores the at least one created address.

24. A system according to claim 20, wherein the system is configured to assign at least one address to at least one further host, wherein the central host is adapted to create the at least one address for the at least one further host and to assign the at least one created address to the at least one further host.

25. A system according to claim 20, wherein the node is selected from one of a communication node; a telecommunication node and a base transceiver station.

26. An apparatus, comprising:
a host device in a local area network, the local area network further comprising at least one switch directly connected to the host and a central host, configured to:
receive, from said central host via said at least one switch, broadcast frames comprising at least one topology descriptor in such a way that only frames dedicated to the host are received, wherein a frame dedicated to the host is a frame containing at least one topology descriptor describing the port number of the switch to which the host is directly connected, and
send, when receiving one or more topology descriptors from the central host, a reporting message to the central host, the reporting message containing the received at least one topology descriptor.

27. The apparatus according to claim 26, wherein the apparatus is configured to ignore tagged frames and to evaluate only untagged frames.

28. The apparatus according to claim 27, wherein the apparatus is configured to create at least one address and to return the at least one created address to the central host.

29. The apparatus according to claim 28, wherein the at least one address created by the apparatus comprise at least one of a Media Access Control address and an Internet Protocol address.

30. The apparatus according to claim 28, wherein the apparatus is configured to create the at least one address by using a look-up operation to look up in a pre-defined table mapping topology descriptors to addresses.

31. The apparatus according to claim 28, wherein the apparatus is configured to create an identifier for identifying the host in the local area network based on a port number of a port to which the host is connected.

32. An apparatus, comprising:
a central host device in a local area network, the local area network further comprising at least one switch and at least one further host directly connected to one of said at least one switch, the central host device configured to:
send, in broadcast frames, at least one topology descriptor to the at least one further host, wherein the at least one topology descriptor is sent in broadcast frames in such a way that only frames dedicated to a certain host reach, or are processed by, that host, wherein a frame dedicated to a certain host is a frame containing at least one topology descriptor describing the port number of the switch to which that host is directly connected,
receive, from each of the at least one further host, at least one of a reporting message containing the received at least one topology descriptor, and
build up a topology data base describing the network topology based on the received at least one topology descriptor.

33. The apparatus according to claim 32, wherein the apparatus is further configured to send the topology descriptor in payloads of broadcast frames.

34. The apparatus according to claim 32, wherein the apparatus is further configured to provide at least one address to the hosts.

35. A non-transitory computer-readable medium having a computer program embodied thereon, the computer program configured to cause a processor to:
send, in broadcast frames, at least one topology descriptor from a central host to at least one further host;
filter, by at least one switch, the broadcast frames containing the sent at least one topology descriptor in such a way that only frames dedicated to a certain host reach, or are processed by, that host, wherein a frame dedicated to a certain host is a frame containing at least one topology descriptor describing the port number of the switch to which that host is directly connected;
receive, at the at least one further host, the at least one topology descriptor sent in frames dedicated to the at least one further host;
reporting, from each of the at least one further host, the received at least one topology descriptor to the central host;
build up, at the central host, a topology data base describing the network topology based on the reported received at least one topology descriptor.

36. An apparatus, comprising:
a device in a local area network, the local area network further comprising a central host and at least one further host directly connected to the device, configured to:
receive, from the central host, broadcast frames containing at least one topology descriptor;
filter the broadcast frames containing the at least one topology descriptor in such a way that only frames dedicated to a certain host reach that host, wherein a frame dedicated to a certain host is a frame containing at least one topology descriptor describing the port number of the device to which that host is directly connected, and
forward a reporting message containing the at least one topology descriptor of at least one further host from the at least one further host to the central host.

37. The apparatus according to claim 36, wherein the device is a switch.

* * * * *